United States Patent [19]

Sato et al.

[11] 4,243,728

[45] Jan. 6, 1981

[54] DOUBLE-METAL-COATED METAL SULFIDE POWDER AND PROCESS OF PRODUCING THE SAME

[75] Inventors: Haruki Sato; Yoshio Kawasumi, both of Urawa, Japan

[73] Assignee: Nihon Kogyo Kabushiki Kaisha, Tokyo, Japan

[21] Appl. No.: 964,231

[22] Filed: Nov. 28, 1978

[30] Foreign Application Priority Data

Dec. 1, 1977 [JP] Japan .................... 52-143276

[51] Int. Cl.$^3$ .............................................. B22F 00/00
[52] U.S. Cl. ..................... 428/570; 427/217; 427/214; 428/403; 252/12; 252/26
[58] Field of Search ............... 427/214, 217; 252/12, 252/26; 75/231; 428/570

[56] References Cited

FOREIGN PATENT DOCUMENTS 1517609  7/1978  United Kingdom .

*Primary Examiner*—Sam Silverberg
*Attorney, Agent, or Firm*—Seidel, Gonda, Goldhammer & Panitch

[57] ABSTRACT

A double-metal-coated metal sulfide powder comprises particles of a metal sulfide, a layer of a platinum group metal coating formed thereon, and an outer coating layer of a metal or alloy which contains at least one of iron, copper, nickel, and cobalt. The powder is obtained by forming a platinum group metal layer on metal sulfide particles by thermal decomposition of a plating composition which includes at least one platinum-metal compound containing a radical selected from the class consisting of NO, $NO_2$, $NO_3$, and NOCl and then forming a layer of at least one metal selected from the group consisting of iron, copper, nickel, and cobalt by the cementation reaction.

17 Claims, No Drawings

DOUBLE-METAL-COATED METAL SULFIDE POWDER AND PROCESS OF PRODUCING THE SAME

BACKGROUND OF THE INVENTION

This invention relates to a double-metal-coated metal sulfide powder consisting of metal sulfide particles each having a platinum group metal coating layer and an outer coating layer of a metal or an alloy which contains at least one of iron, copper, nickel, and cobalt, and a process of producing such powder.

The composite powder of a double-coating type thus obtained is exceedingly desirable as a solid lubricant for use in the self-lubricating powder materials to be shaped and sintered to oilless bearings, sliding parts, and the like.

The self-lubricating parts such as those of oilless bearings have usually been fabricated by mixing the powder of copper, tin or other metals as the base with the powder of a solid lubricant, typified by molybdenum disulfide, pressing the mixture in dies to produce compressed shapes, sintering the shapes, and finally impregnating the products with oil. However, if such a solid lubricating powder of molybdenum disulfide or the like is directly added to the base metal powder, a good self-lubricating product will not result because of ununiformity in mixing and low strength attained on sintering. For this reason attempts have been made to use the powder of solid lubricant in the form of a composite powder consisting of the solid lubricant particles thinly coated with copper, nickel, iron, cobalt, or other second metal.

Methods of producing such composite powders have heretofore depended on thermal decomposition, reduction, vapor-phase reaction, plating reaction, and vacuum evaporation. However, they have varied disadvantages in the process of manufacture, quality of the product, and in respect of the equipment required. No method has been established yet which will produce a composite powder of a high, stable quality in a simplified process on an industrial basis. In view of these, the present applicant previously proposed a new process which could replace the conventional processes for manufacturing such composite powders with copper outer layer. The process was characterized by the steps of adding and mixing the powder of a metal or alloy baser than copper with the powder of a metal sulfide, and adding an acidic solution containing copper ions to the mixture with stirring, whereby the metal sulfide particles are coated with the metallic copper formed in a cementation reaction. Composite powders could then be obtained in a far more simplified way than before.

Although that cementation process rendered it possible to manufacture composite powders of very high quality, further investigations were made to improve the process so that easier and more uniform deposition of the copper coat with good throwing power on metal sulfide particles could be ensured. The surface of metal sulfide particles originally are not highly active and it follows that the deposition of copper or other metal on the particle surface would be facilitated if the latter could be made more active. With this in view, extensive studies have been made and, as a result, it has now been found very useful to produce a platinum group metal coating layer on metal sulfide particles.

Coating a metal sulfide surface with a platinum group metal layer may be accomplished in a number of ways. For electroless plating with platinum group metals, a variety of compositions in the form of plating solutions or the like have been proposed since many years ago. They include, for example, (a) a plating solution of a mixture containing a platinum group metal in an organic solvent, which utilizes thermal decomposition at temperatures between 300° and 500° C., (b) a plating paste obtained by dispersing a platinum group metal powder in a liquid containing polyterpene resin that ranges in molecular weight from 350 to 870, (c) a plating solution prepared by adding a chloride of platinum metal to a polar organic solvent or a hydrochloric acid solution, and (d) a plating mixture containing a platinum group metal compound and an organic amine as principal ingredients. Many other plating compositions have thus far been proposed or put in use.

Those compositions of the prior art have one drawback or another, such as inadequate adhesion of the plating film, too high thermal decomposition temperature, or the necessity of employing an organic solvent. In view of this, a new platinum group metal plating composition has recently been developed by the present applicant. The composition, described in Japanese patent application No. 125846/1975, may be briefly defined as one which uses at least one platinum group metal compound containing a radical selected from the class consisting of NO, $NO_2$, $NO_3$, and NOCl. The development of the plating composition was based on the discovery that, with platinum group metal salts containing such a radical, the thermal decomposition reaction will explosively proceed in the low temperature range of 210°–300° C. and, moreover, the reaction will be exothermic. As an accelerator for the thermal decomposition reaction, at least one member of the group consisting of ammonium hydroxide, ammonium nitrate, and ammonium nitrite is desirably added to the composition. In using, water is added to the composition to prepare an aqueous solution or paste as desired. The plating composition taught by the patent application No. 125846/1975 permits the use of a lower thermal decomposition temperature than are usually required, and gives a plating layer highly adherent to the surface without contaminating the working environment.

In forming the intermediate platinum group metal layer in accordance with the present invention, the technique revealed in the above-mentioned patent application was found particularly useful, although the varied electrolytic and electroless plating techniques in common use may, of course, be employed. The platinum group metal plating composition in the above-mentioned application was originally intended for forming a plating layer that represents the final surface of the object; it was not contemplated to coat the plated surface with still another metal. In the present invention, by contrast, the platinum-metal layer is intended to serve as an interposed layer between each metal sulfide particle and its final metal layer. In order to form a platinum group metal layer optimum as the interposed one, it is necessary to take into consideration the adhesion between the platinum group metal layer and the overlying metal layer, uniformity of nuclear formation and growth in the top-coat metal, and other factors. Also, because the employment of the aforementioned cementation process for the application of the top-coat metal is contemplated in the present invention, the shifting from the intermediate to the final layer formation operation is required to be made as smoothly as possible. Investigations with due consideration of these have led to a conclusion that, of the techniques available for the intermediate-layer formation, the method of patent application No. 125846/1975 is the most desirable.

BRIEF SUMMARY OF THE INVENTION

Thus, in accordance with the invention, a double-metal-coated metal sulfide powder is provided which comprises particles of a metal sulfide, a layer of a platinum metal coating formed thereon, and an outer coating layer of a metal or alloy which contains at least one of iron, copper, nickel, and cobalt. In another aspect of the invention, a process of producing such a double-metal-coated metal sulfide powder is provided which comprises the steps of forming a platinum group metal layer on metal sulfide particles by thermal decomposition of a plating composition which includes at least one platinum group metal compound containing a radical selected from the class consisting of NO, $NO_2$, $NO_3$ and NOCl, adding and mixing the powder of a metal or alloy baser than iron, copper, nickel, and cobalt, with the powder of metal sulfide coated with the platinum group metal layer, further adding an acidic solution containing the ions of at least one of iron, copper, nickel, and cobalt to the mixture obtained in the preceding step, with stirring, and thereby coating the platinum group metal layer with at least one of iron, copper, nickel, and cobalt, that results from a cementation reaction.

DETAILED DESCRIPTION

The present invention will now be described in detail.

Suitable metal sulfide powder for use in the invention is of a particle size between $-100$ mesh and $+400$ mesh. Particles larger than 100 mesh in size will have ununiform coating, whereas those finer than 400 mesh will give coated powder which poses the problems of low fluidity and surface oxidation. The metal sulfide is typically represented by molybdenum disulfide or tungsten disulfide, although others may be employed when desired.

The metal sulfide powder is sometimes too fine or contains a large proportion of exceedingly flat particles or has an excessively broad range of particle size, depending on the source from which the material is derived. In such cases, preliminary grinding and granulation or sizing of the granules or particles will prove highly beneficial. By way of example, the metal sulfide powder may be ground and granulated by a grinding-granulating mixer, using a binder prepared by diluting a resol and/or novolak type phenol resin with alcohol. Following this, granules in the desired range of size are recovered. The remainder is once again subjected to grinding and granulation with the addition of alcohol. Repetition of this procedure permits eventual granulation and sizing of all the material powder to granules of a predetermined size.

Next, the metal sulfide powder is placed in a vessel and is coated with a platinum group metal to form an under coat. While this may be accomplished in any manner customary in the art, the best result will be obtained by use of an aqueous plating solution, as already noted, which contains at least one platinum group metal compound containing a member of the group consisting of NO, $NO_2$, $NO_3$, and NOCl and preferably at least a member of the group consisting of ammonium hydroxide, ammonium nitrate, and ammonium nitrite.

When coating the metal sulfide powder with palladium, for example, an aqueous plating solution containing $Pd(NH_3)_2-(NO)_2$, $Pd(NH_3)_4(NO_3)_2$, or $Pd(NO_3)_2$ in an amount from 0.001 to 35 g, in terms of Pd, per liter of the solution is used. For coating with ruthenium, from 0.01 to 28 g/l of $Ru(NO)(OH)_3$ is used. The same amount as with ruthenium may be used in platinum plating with $Pt(NH_3)_2(NO_2)_2$, is osmium plating with $OsO(NO)OH$, in rhodium plating with $(NH_4)_3Rh(NO_2)_6$ or $Rh(NO_3)_3.2H_2O$, or in iridium plating with $(NH_4)_3Ir(NO_2)_6$. If desired, $NH_4OH$, $NH_4NO_3$, or $NH_4NO_2$ may be added in an amount from 0.001 to 50 g/l.

In any case, the plating composition may take the form of an aqueous solution or paste depending on the proportions of the ammonium compound and water added. In the present invention, the composition is usually used as an aqueous solution, because it has only to form a thin intermediate layer.

The plating solution is introduced into a vessel containing the metal sulfide powder. The solution may be brought into contact with the powder by spraying and flow coating. The quantity of the plating composition varies with the amount and particle size of the sulfide powder, concentration of the plating solution, and the mode of application. Taking these into consideration, a suitable quantity just enough for depositing the platinum metal evenly on the whole surface of the metal sulfide powder is chosen.

Heating is done in the temperature range of 250°–400° C. by directing a propane burner against the powder, to such an extent that the burner flame lightly touches the particles. In this way a metal sulfide powder evenly coated with the particular platinum group metal is obtained.

Next, the coated powder is subjected to cementation. Since the final layer is deposited not directly on the metal sulfide surface but on the activated surface of the platinum group metal in accordance with the invention, the deposition is facilitated and one or more of the metals, iron, copper, nickel, and cobalt or alloys thereof can be easily deposited on the platinum group metal surface.

Depending on the kind of the metal to be finally deposited on the platinum group metal-coated metal sulfide powder, the powder of a less noble metal and/or alloy is added. As the metal to be added, a suitable one from the economic viewpoint is chosen from among zinc, iron, aluminum, magnesium, and calcium. Where iron is to form the final metal plating layer, the use of aluminum, zinc, or the like gives good result. Where the final layer is of copper, nickel, or cobalt, it is desirable to employ iron, especially reduced iron powder. Desirably the particle size of the metal to be added ranges from $-100$ mesh to $+400$ mesh. If the powder contains much particles coarser than 100 mesh, the resulting coat will be uneven. Conversely if the proportion of particles finer than 400 mesh is high, the particles will be largely dissolved by a reaction with the free acid in the process of cementation and will be wastefully consumed without taking part in the reaction for precipitation of the metal. The proper amount to be added is believed to be slightly more, say about 1.01 times larger, than the stoichiometric equivalent of the intended amount of the metal to form the final layer.

As regards the acidic solution containing the ions of the metal to form the final layer, its metal ion concentration is not definitely stated, since it varies with the size of the particular metal sulfide powder and the quantity of the metal to be used in plating. Experiments indicated that, where the quantity of copper to be used for coating was 50% by weight of that of the metal sulfide powder, a copper concentration in the range of 30–60 g/l gave satisfactory result. In cases of other metals, useful ranges were between 10 and 80 g/l. As the sources of metal ions, sulfate, hydrochloride, and nitrate give generally similar effects. Among useful free acids are sulfuric, hydrochloric, nitric, acetic, and oxalic acids. Their concentrations cannot be definitely given, either, because of various factors involved. In case of sulfuric acid, 0.5 g/l or more will generally have the same effect.

In operation, a reaction vessel is charged with a platinum group metal-coated sulfide powder and the powder of a selected metal or alloy less noble than the particular metal, i.e., iron, copper, nickel, or cobalt, to be deposited as the final layer on the coated sulfide particles. By way of simplification, it is assumed that copper is deposited as the final layer and iron powder is added as an addition agent. The iron powder is added in an amount slightly more than one time the intended amount of copper plating, e.g., the equivalent to 50% of the metal sulfide particles. The platinum group metal-coated metal sulfide particles and the iron powder are mixed by agitator blades installed in the reaction vessel, and a copper salt solution is added to the mixture. The copper salt solution is added little by little to bring the mixture up to the funicular [II] region in 20 seconds to 10 minutes, and then to the slurry region in a short period of from 5 to 10 seconds. The terms "funicular [II]" and "slurry" regions are herein used in accordance with the indication practice in the art which classifies the state of packing and fluidity of solid-liquid systems into five stages, as tabulated below for reference:

| Region | Solid phase | Liquid phase | Condition | Fluidity |
| --- | --- | --- | --- | --- |
| (1) Pendular | Continuous | Discontinuous | Loose | Dilatant dispersion |
| (2) Funicular [I] | " | Continuous | " | Pseudoplastic dispersion |
| (3) Funicular [II] | " | " | " | Plastic dispersion |
| (4) Capillary | Discontinuous | " | Viscous | Shear-hardened dispersion |
| (5) Slurry | " | " | Muddy | False body dispersion |

Following the addition of a predetermined amount of the copper salt solution, the agitation is continued for some time, e.g., about 30 seconds. After the agitation, the double-metal-coated composite powder that has resulted is recovered, washed with water, and dried. The amounts of plating metals can be controlled within the intended values plus or minus 5%.

When using a metal other than copper, e.g., iron, nickel, or cobalt, in forming the final metal layer, the procedure is the same as with copper, excepting that the kind and quantity of metal and the kind and/or quantity of the acid solution are suitably changed.

The composite powder thus obtained is a powder of good quality with an exceedingly uniform final metal layer formed all over the individual particles. The product is most appropriate as a solid lubricant for use in self-lubricating parts. With more complete and uniform deposition than would be produced in the absence of the intermediate platinum group metal layer, the final metal layer is free of any holiday or mottle.

EXAMPLE

The 1000 g of molybdenum disulfide powder granulated and sized within the range from −150 mesh to +250 mesh was added 1000 ml of an aqueous solution of palladium nitrate (containing 0.14 g palladium). The both were mixed up and, on a porcelain dish, the mixture was heated in air at 400° C. for 30 minutes by a propane burner. A thin layer of palladium was formed on the molybdenum disulfide particles. Next, with the view to depositing copper as the final layer in an amount equivalent to 50% of the molybdenum disulfide, 200 g of the palladium-coated molybdenum disulfide powder and 177.2 g of reduced iron powder ranging in particle size from −100 to +400 mesh were charged into a cementation vessel equipped with agitator blades. While the both were being stirred together, an acidic copper sulfate solution composed of 48 g/l of copper and 200 g/l of sulfuric acid was added slowly, so that the funicular [II] region was arrived at in about 30 seconds. Three more seconds later, the perfect "slurry" region was reached. The remainder of the acidic copper sulfate solution required was added over a further period of about 10 seconds. The total amount of the copper sulfate solution added was 3.2 l, or 154 g in terms of copper. After the addition the agitation was continued for about 30 seconds to conclude the copper coating treatment. The copper-coated powder was recovered, washed, and dried. The particles thus obtained had been evenly coated with copper, with a fully satisfactory tone of color. The copper deposited accounted for 49.5% of the total powder weight.

In order to add the composite powder produced in the Example of the invention as a solid lubricant to a composition for the manufacture of self-lubricating parts, the following mixture was prepared:

| Component | Mixing rate (wt %) |
| --- | --- |
| Copper powder | 80.8 |
| Tin powder | 8.9 |
| Composite powder of Example | 10.0 |
| Stearate | 0.3 |

The mixture was compacted to a density of 6.0–6.5 g/cm$^3$, and the compact waa sintered in hydrogen at 740° C. to make an oilless bearing metal. Load and roundness tests indicated that the composite powder according to the invention is a perfect solid lubricant.

In tests under load of 160 g and at a speed of 3000 rpm, the bearing metal using the powder of the invention without impregnation with oil showed the same degree of lubricating capability as the ordinary bearing of the Cu-Sn-Pb system with oil impregnation. This means that the bearings containing the powder of the invention, without the need of oil impregnation, will exhibit high performance in heavy-load, low-speed services.

It will be appreciated from the foregoing description that the present invention provides an excellent composite powder as solid lubricant particles to be added to compositions for the preparation of self-lubricating parts. The presence of a platinum group metal layer as an intermediate layer facilitates the deposition of the final metal layer of iron, copper, nickel, or cobalt, and the final metal layer thus formed is extremely uniform. This apparently contributes to the homogeneity of the mixture containing the powder of the invention as the solid lubricant and to the sintereability of the compact. Moreover, the process of the invention, combined with the plating composition of Japanese patent application No. 125846/1975 and the cementation technique, provides a simplified process having no danger of environmental pollution. This is believed to be a great contribution to the industry.

What is claimed is:

1. A process of producing a double-metal-coated metal sulfide powder, which comprises the steps of forming a platinum group metal layer on metal sulfide particles by thermal decomposition of a plating composition which includes at least one platinum group metal compound containing a radical selected from the class consisting of NO, $NO_2$, $NO_3$, and NOCl; and forming an outer layer of at least one metal or alloy selected from the group consisting of iron, copper, nickel and cobalt or an alloy thereof on said metal sulfide particles coated with the platinum group metal layer by adding and mixing the powder of a metal or alloy, less noble than said selected metal or alloy and further adding an acidic solution containing the ions of said selected metal(s) to the mixture obtained in the preceding step while stirring to thereby coat said platinum group metal layer with said selected metal(s) that results from a cementation reaction.

2. A process according to claim 1 wherein the metal sulfide powder is selected from a group of molybdenum disulfide and tungsten disulfide powders.

3. A process according to claim 1 wherein the metal sulfide powder has a particle size between about $-100$ mesh and $+400$ mesh.

4. A process according to claim 1 wherein when the starting metal sulfide powder is too fine or coarse and contains a large proportion of flat particles, it is subjected to preliminary granulation and/or sizing.

5. A process according to claim 4 wherein the metal sulfide powder is ground and granulated by a grinding-granulating mixer using a binder prepared by diluting a resol and/or novolak type phenol resin with alcohol.

6. A process according to claim 1 wherein said compound of platinum group metals is at least one selected from the group consisting of $Ru(NO)(OH)_3$, $OsO(NO)OH$, $Pt(NH_3)_2(NO_2)_2$, $(NH_4)_3Rh(NO_2)_6$, $Rh(NO_3)_2.2H_2O$, $(NH_4)_3Ir(NO_2)_6$, $Pd(NH_3)_2(NO_2)_2$, $Pd(NO_3)_2$, $Pd(NH_3)_4(NO_3)_4(NO_3)_2$, $Pd(NO_3)_2$.

7. A process according to claim 6 wherein in case palladium plating is effected, either of $Pd(NH_3)_2(NO_2)_2$, $Pd(NH_3)_4(NO_3)_2$ or $Pd(NO_3)_2$ is employed in an amount of not less than 0.001 g/l and not more than 35 g/l in terms of palladium.

8. A process according to claim 6 wherein in case ruthenium, osmium, platinum, rhodium or iridium plating is effected, corresponding one of $Ru(NO)(OH)_3$, $OsO(NO)OH$, $Pt(NH_3)_2(NO_2)_2$, $(NH_4)_3Rh(NO_2)_6$ or $Rh(NO_3)_2.2H_2O$, or $(NH_4)_3Ir(NO_2)_6$ is employed in an amount of not less than 0.01 g/l and not more than 28 g/l in terms of a platinum metal.

9. A process according to claim 1 wherein the plating composition further contains $NH_4OH$, $NH_4NO_3$ or $NH_4NO_2$.

10. A process according to claim 1 wherein the thermal decomposition is carried out at about 250° to 400° C.

11. A process according to claim 1 wherein the metal and/or alloy powder added is selected from a group of powders of zinc, iron, aluminum, magnesium, calcium or an alloy thereof.

12. A process according to claim 1 wherein the metal and/or alloy powder added has a particle size range from $-100$ to $+400$ mesh.

13. A process according to claim 1 wherein the metal and/or alloy powder added is in a amount slightly more than the stoichiometric equivalent of the intended amount of the metal or alloy formed as the outer layer.

14. A process according to claim 1 wherein the source of the selected metal(s) is selected from the salts of sulfuric, hydrochloric, nitric, and organic acids thereof.

15. A process according to claim 1 wherein the acid to be employed is selected from a group of sulfuric acid, hydrochloric acid, nitric acid, acetic acid and oxalic acid.

16. A process according to claim 1 wherein the addition of the acidic solution is so effected that the funicular [II] region is reached in about 20 seconds to 10 minutes and then the slurry region is reached in 5 to 10 seconds.

17. A double-metal-coated metal sulfide powder made according to the process of claim 1.

* * * * *